United States Patent
Le et al.

(10) Patent No.: US 10,554,890 B1
(45) Date of Patent: Feb. 4, 2020

(54) APPARATUS AND METHOD FOR GENERATING LOW-LIGHT IMAGES WITH IMPROVED BOKEH USING MOBILE ELECTRONIC DEVICE

(71) Applicant: Samsung Electronics Co., Ltd., Suwon-si, Gyeonggi-do (KR)

(72) Inventors: Long N. Le, Richardson, TX (US); John W. Glotzbach, Allen, TX (US); Hamid R. Sheikh, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/278,581

(22) Filed: Feb. 18, 2019

(51) Int. Cl.
| | |
|---|---|
| *G03B 17/00* | (2006.01) |
| *H04N 5/232* | (2006.01) |
| *G06T 7/55* | (2017.01) |
| *G06T 5/00* | (2006.01) |
| *H04N 5/262* | (2006.01) |

(52) U.S. Cl.
CPC ......... *H04N 5/23258* (2013.01); *G06T 5/003* (2013.01); *G06T 7/55* (2017.01); *H04N 5/23267* (2013.01); *H04N 5/2621* (2013.01)

(58) Field of Classification Search
USPC .......................................................... 396/55
See application file for complete search history.

(56) References Cited

U.S. PATENT DOCUMENTS

| | | |
|---|---|---|
| 6,973,220 B2 | 12/2005 | Sakurai et al. |
| 7,418,150 B2 | 8/2008 | Myoga |
| 7,457,477 B2 * | 11/2008 | Petschnigg ............... G06T 5/50 348/370 |
| 8,526,761 B2 | 9/2013 | Kojima et al. |
| 9,154,708 B1 * | 10/2015 | Rivard ................. H04N 5/2352 |
| 9,438,809 B2 | 9/2016 | Sheikh et al. |

(Continued)

FOREIGN PATENT DOCUMENTS

| | | |
|---|---|---|
| CN | 106791382 A | 5/2017 |
| JP | 2008294785 A | 12/2008 |
| KR | 101378333 B1 | 3/2014 |

OTHER PUBLICATIONS

Le et al., "Apparatus and Method for Capturing and Blending Multiple Images for High-Quality Flash Photography Using Mobile Electronic Device", U.S. Appl. No. 16/278,543, filed Feb. 18, 2019, 58 pages.

(Continued)

*Primary Examiner* — Rodney E Fuller

(57) ABSTRACT

A method includes capturing multiple pairs of images of a scene at different exposures using at least one camera of an electronic device. Each pair of images includes (i) an ambient image of the scene captured without using a flash of the electronic device and (ii) a flash image of the scene captured using the flash of the electronic device. The method also includes rendering a final image of the scene with a bokeh that is determined using the multiple pairs of images. One of the ambient images or the flash images are captured in order of increasing exposure time, and the other of the ambient images or the flash images are captured in order of decreasing exposure time. The method may also include estimating a depth map associated with the scene using the pairs of images, where the bokeh is based on the depth map.

20 Claims, 11 Drawing Sheets

(56) References Cited

U.S. PATENT DOCUMENTS

| | | | |
|---|---|---|---|
| 9,466,113 B2 | 10/2016 | Pham | |
| 9,495,762 B2 | 11/2016 | Shroff et al. | |
| 10,097,765 B2 | 10/2018 | Sheikh et al. | |
| 10,341,574 B2* | 7/2019 | Cote | |
| 2006/0008171 A1* | 1/2006 | Petschnigg | G06T 5/50 |
| | | | 382/254 |
| 2006/0050335 A1* | 3/2006 | Dorrell | H04N 1/6086 |
| | | | 358/516 |
| 2007/0024742 A1* | 2/2007 | Raskar | H04N 5/2352 |
| | | | 348/370 |
| 2007/0025717 A1* | 2/2007 | Raskar | G03B 15/03 |
| | | | 396/155 |
| 2007/0025720 A1* | 2/2007 | Raskar | G03B 7/16 |
| | | | 396/213 |
| 2007/0263119 A1* | 11/2007 | Shum | H04N 5/2354 |
| | | | 348/371 |
| 2008/0297621 A1* | 12/2008 | Sun | H04N 5/23232 |
| | | | 348/224.1 |
| 2011/0280475 A1 | 11/2011 | Singhal et al. | |
| 2011/0292216 A1* | 12/2011 | Fergus | G03B 15/03 |
| | | | 348/164 |
| 2013/0329015 A1* | 12/2013 | Pulli | H04N 13/239 |
| | | | 348/47 |
| 2013/0335596 A1* | 12/2013 | Demandolx | H04N 5/2354 |
| | | | 348/231.99 |
| 2015/0350504 A1* | 12/2015 | Corcoran | H04N 5/2254 |
| | | | 348/211.99 |
| 2016/0323518 A1* | 11/2016 | Rivard | H04N 5/247 |
| 2017/0039686 A1 | 2/2017 | Miura et al. | |
| 2017/0148142 A1 | 5/2017 | Park | |

OTHER PUBLICATIONS

Zhen et al., "System and Method for Compositing High Dynamic Range Images", U.S. Appl. No. 16/277,630, filed Feb. 15, 2019, 52 pages.

* cited by examiner

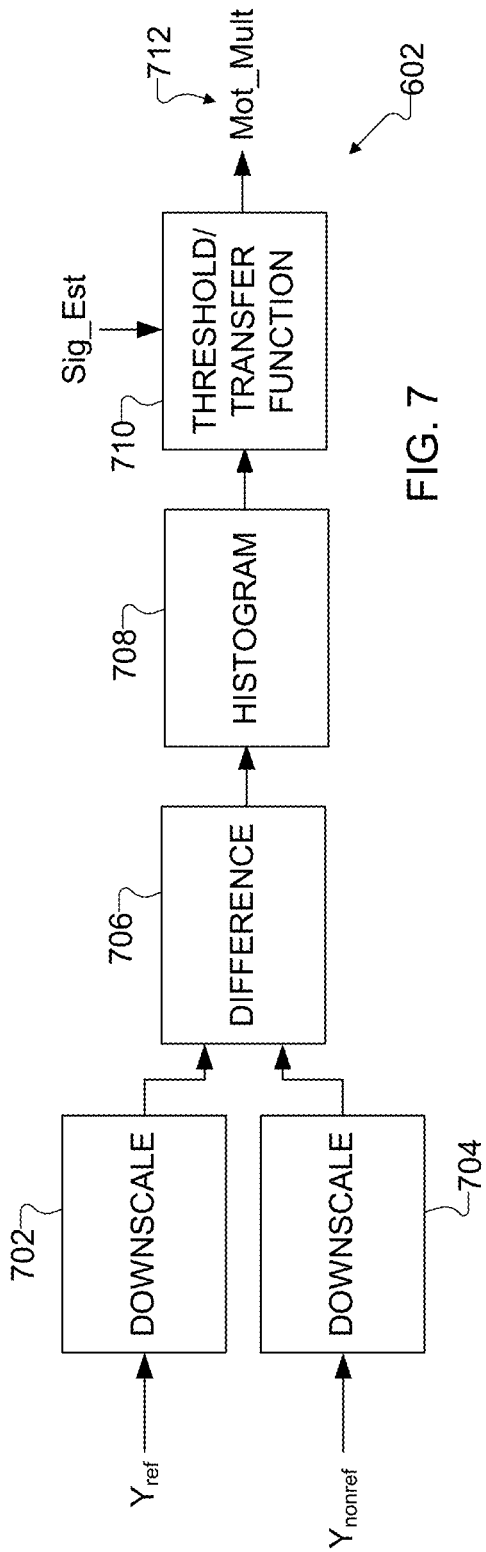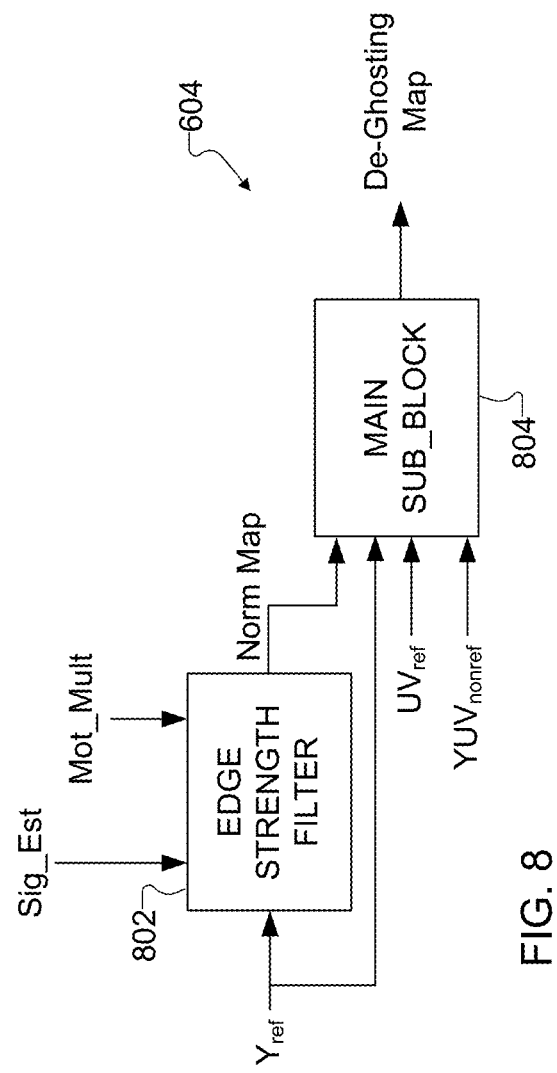
FIG. 7
FIG. 8

APPARATUS AND METHOD FOR GENERATING LOW-LIGHT IMAGES WITH IMPROVED BOKEH USING MOBILE ELECTRONIC DEVICE

TECHNICAL FIELD

This disclosure relates generally to image capturing systems. More specifically, this disclosure relates to an apparatus and method for generating low-light images with improved bokeh using a mobile electronic device.

BACKGROUND

Many mobile electronic devices, such as smartphones and tablet computers, include cameras that can be used to capture still and video images. While convenient, cameras on mobile electronic devices typically suffer from a number of shortcomings, including poor performance in low-light situations. For example, "bokeh" refers to an effect that helps to improve the aesthetic quality of an image by blurring out-of-focus portions of the image (such as a background of the image) while keeping other portions of the image (such as a foreground or one or more subjects) in focus. For many mobile electronic devices, bokeh is achieved computationally rather than optically. However, it is often difficult to computationally generate bokeh for images captured in low-light situations. As a result, mobile electronic devices may limit the computational generation of bokeh to images of daytime or well-lit scenes, which is unfortunate since bokeh is significantly more effective in low-light situations.

SUMMARY

This disclosure provides an apparatus and method for generating low-light images with improved bokeh using a mobile electronic device.

In a first embodiment, a method includes capturing multiple pairs of images of a scene at different exposures using at least one camera of an electronic device. Each pair of images includes (i) an ambient image of the scene captured without using a flash of the electronic device and (ii) a flash image of the scene captured using the flash of the electronic device. The method also includes rendering a final image of the scene with a bokeh that is determined using the multiple pairs of images. One of the ambient images or the flash images are captured in order of increasing exposure time, and the other of the ambient images or the flash images are captured in order of decreasing exposure time.

In a second embodiment, an electronic device includes at least one camera, a flash, and at least one processing device. The at least one processing device is configured to capture multiple pairs of images of a scene at different exposures using the at least one camera. Each pair of images includes (i) an ambient image of the scene captured without using the flash and (ii) a flash image of the scene captured using the flash. The at least one processing device is also configured to render a final image of the scene with a bokeh that is determined using the multiple pairs of images. The at least one processing device is configured to capture one of the ambient images or the flash images in order of increasing exposure time and the other of the ambient images or the flash images in order of decreasing exposure time.

In a third embodiment, a non-transitory machine-readable medium contains instructions that when executed cause at least one processor of an electronic device to capture multiple pairs of images of a scene at different exposures using at least one camera of the electronic device. Each pair of images includes (i) an ambient image of the scene captured without using a flash of the electronic device and (ii) a flash image of the scene captured using the flash of the electronic device. The medium also contains instructions that when executed cause the at least one processor of the electronic device to render a final image of the scene with a bokeh that is determined using the multiple pairs of images. The instructions that when executed cause the at least one processor to capture the multiple pairs of images include instructions that when executed cause the at least one processor to capture one of the ambient images or the flash images in order of increasing exposure time and the other of the ambient images or the flash images in order of decreasing exposure time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first"

and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments thereof, but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 6, 7, 8, 9, and 10 illustrate an example process for a de-ghosting operation in the process of FIG. 3 in accordance with this disclosure;

DETAILED DESCRIPTION

FIGS. 1 through 16, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, cameras in many mobile electronic devices suffer from a number of shortcomings, including poor performance in low-light situations. For example, the creation of bokeh in images of low-light scenes is often challenging. One reason for this is that a mobile electronic device often needs an accurate pixel-level depth map of a scene in order to computationally generate bokeh in an image of the scene. The depth map can, for example, identify the estimated relative depth of one or more subjects or objects in the scene relative to a background of the scene. However, extracting an accurate depth map in a nighttime or other low-light scene can be difficult due to a lack of visible features in images of the scene.

This disclosure provides techniques for using multiple images of a scene captured with and without using a flash to generate bokeh in at least one final image of the scene. For example, these techniques can estimate a pixel-level depth map from multiple pairs of images, and bokeh can be generated in a final image based on the estimated depth map. These techniques may also use a symmetric capture strategy in which the non-flash images are captured at an increasing exposure time and the flash images are captured at a decreasing exposure time (or vice versa), which helps to reduce motion ghosting artifacts in the final image of the scene. Specularity filtering can also be performed to help improve the quality of the final image. These techniques may allow, for example, more aesthetically-pleasing images having improved bokeh to be produced in low-light situations.

Figure 1:
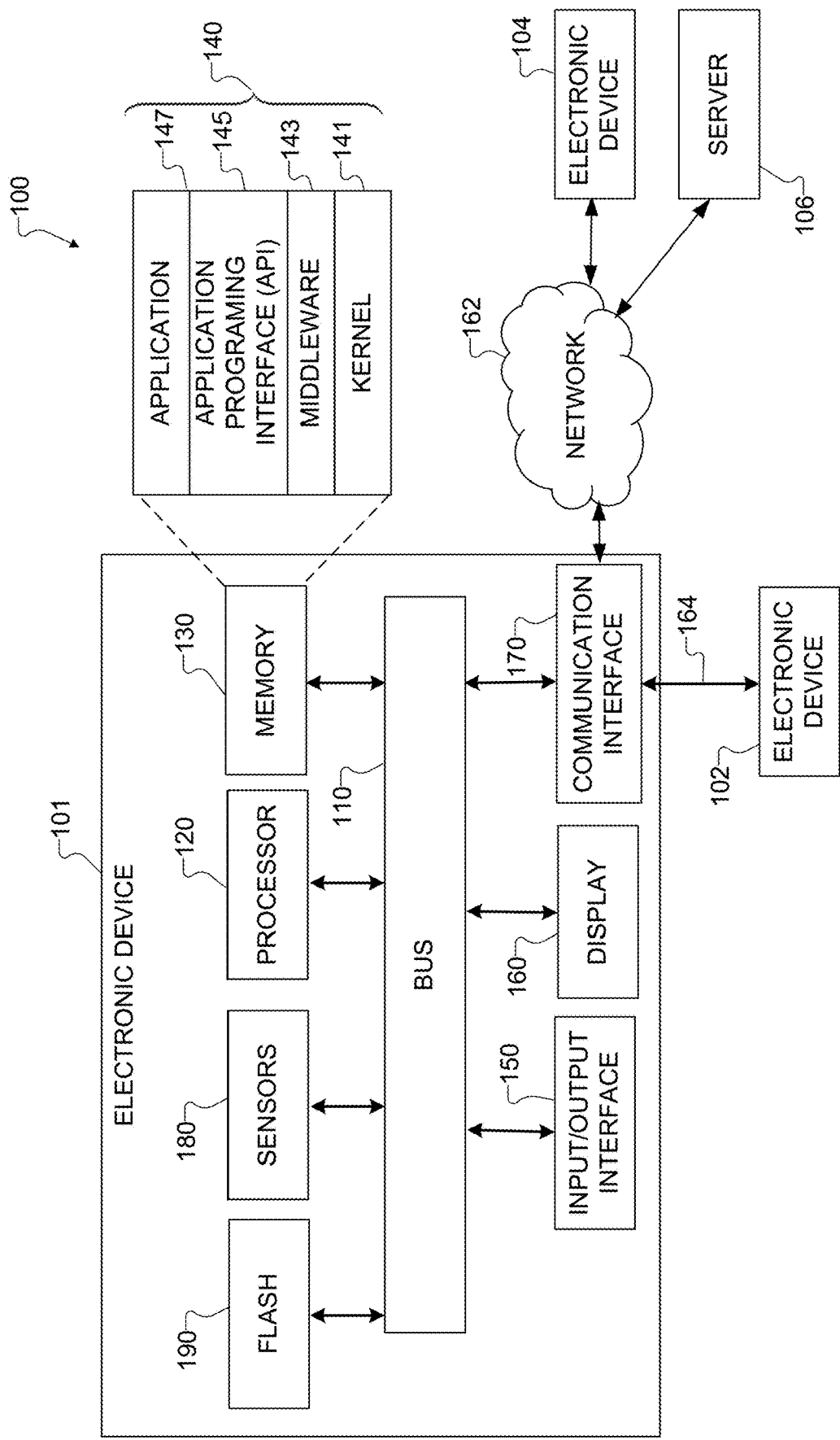
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). For example, the processor 120 can receive image data captured by at least one camera during a capture event. Among other things, the processor 120 can process the image data (as discussed in more detail below) to perform multi-pair image analysis and image rendering to produce images having improved bokeh (such as in low-light situations).

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 includes one or more applications for image capture as discussed below. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The electronic device 101 further includes one or more sensors 180 that can meter a physical quantity or detect an activation state of the electronic device 101 and convert metered or detected information into an electrical signal. For example, one or more sensors 180 can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG)

sensor, an electrocardiogram (ECG) sensor, an infrared (IR) sensor, an ultrasound sensor, an iris sensor, or a fingerprint sensor. The sensor(s) 180 can also include an inertial measurement unit, which can include one or more accelerometers, gyroscopes, and other components. The sensor(s) 180 can further include a control circuit for controlling at least one of the sensors included here. Any of these sensor(s) 180 can be located within the electronic device 101. The one or more cameras can capture images as discussed below and are used in conjunction with at least one flash 190. The flash 190 represents a device configured to generate illumination for use in image capture by the electronic device 101, such as one or more LEDs.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can optionally support the electronic device 101 by performing or supporting at least one of the operations (or functions) implemented on the electronic device 101. For example, the server 106 can include a processing module or processor that may support the processor 120 implemented in the electronic device 101.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
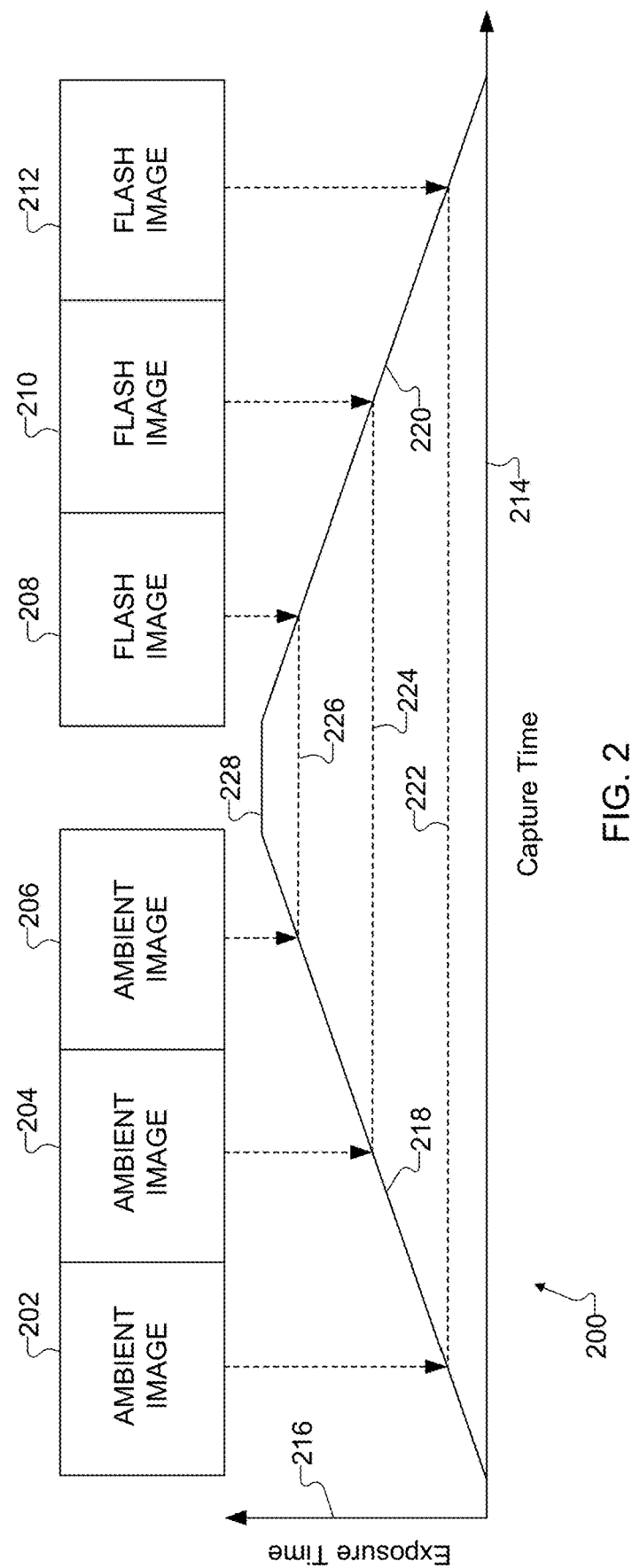
FIG. 2 illustrates an example process for capturing images in a mobile electronic device in accordance with this disclosure.

FIG. 2 illustrates an example process 200 for capturing images in a mobile electronic device in accordance with this disclosure. For ease of explanation, the process 200 shown in FIG. 2 is described as being performed using the electronic device 101 of FIG. 1. However, the process 200 shown in FIG. 2 could be used with any other suitable electronic device and in any suitable system.

The process 200 is generally used to capture multiple images of a scene that are processed (as described in more detail below) to estimate a depth map for the scene. The estimated depth map can then be used (as described in more detail below) to generate at least one final image of the scene having improved bokeh. This allows improved images to be captured of nighttime or other low-light scenes, since certain areas of each final image (such as the foreground or one or more subjects in the image) can remain in focus while other portions of the image can be blurred.

As shown in FIG. 2, the process 200 involves the capture of multiple ambient images 202, 204, and 206 and the capture of multiple flash images 208, 210, and 212. An ambient image generally refers to an image of a scene in which little or no light from the electronic device 101 is illuminating the scene, so the flash 190 may not be used in the capture of the ambient images 202, 204, and 206. In some instances, during the capture operation, the processor 120 can control the camera of the electronic device 101 so that the ambient images 202, 204, and 206 are captured rapidly, such as in a burst mode. A flash image generally refers to an image of a scene in which light from the electronic device 101 is illuminating the scene, so the flash 190 is used in the capture of the flash images 208, 210, and 212. In some instances, during the capture operation, the processor 120 can control the camera of the electronic device 101 so that the flash images 208, 210, and 212 are captured rapidly, such as in a burst mode. The flash images 208, 210, and 212 may also be captured using a common flash strength. The flash strength used here may denote a default flash strength or other flash strength used by the camera or the electronic device 101.

The capture request that triggers the capture of the images 202-212 represents any suitable command or input indicating a need or desire to capture an image of a scene using the electronic device 101. For example, the capture request could be initiated in response to a user's pressing of a "soft"

button presented on the display 160 or the user's pressing of a "hard" button. In this example, the ambient images 202, 204, and 206 are captured before the flash images 208, 210, and 212 are captured, although this need not be the case. Also, in this example, three ambient images 202, 204, and 206 and three flash images 208, 210, and 212 are captured in response to the capture request, although two or more than three ambient images and/or two or more than three flash images could be captured here.

As shown in FIG. 2, the ambient images 202, 204, and 206 and the flash images 208, 210, and 212 are captured using different exposure times. A chart in FIG. 2 plots a capture time 214 (the time at which an image is captured) versus exposure time 216 (the exposure time for capturing an image). As can be seen in FIG. 2, the ambient images 202, 204, and 206 are captured in time sequence at an increasing exposure time defined by a ramp 218, and the flash images 208, 210, and 212 are captured in time sequence at a decreasing exposure time defined by a ramp 220. However, the flash images 208, 210, and 212 could alternatively be captured at an increasing exposure time defined by the ramp 218, and the ambient images 202, 204, and 206 could alternatively be captured at a decreasing exposure time defined by the ramp 220. In some embodiments, the ramps 218 and 220 are linear, meaning the exposure times for the ambient and flash images increase or decrease linearly. However, linear increases or decreases in exposure times are not required here.

As seen in FIG. 2, the capture of the ambient images 202, 204, and 206 and the capture of the flash images 208, 210, and 212 can be symmetric. That is, for each ambient image 202, 204, and 206 captured using a specified exposure time, one of the flash images 208, 210, and 212 is captured using the same specified exposure time. This results in the capture of multiple pairs of images, where (i) each image pair includes one of the ambient images 202, 204, and 206 and one of the flash images 208, 210, and 212 that are captured using the same exposure time and (ii) different image pairs include images captured at different exposure times.

In this example, the ambient image 202 and the flash image 212 form a first image pair, the ambient image 204 and the flash image 210 form a second image pair, and the ambient image 206 and the flash image 208 form a third image pair. The ambient image 202 and the flash image 212 in the first image pair are separated in time by a first time period 222, which represents the longest period of time between images in any of the pairs. Because the images 202 and 212 are separated by the longest time period, the maximum amount of motion between the images in any of the pairs occurs in these images 202 and 212, and these images 202 and 212 will have the poorest signal-to-noise ratio of the pairs. The ambient image 204 and the flash image 210 in the second image pair are separated in time by a second time period 224, which is shorter than the first time period 222. Because the images 204 and 210 are separated by a shorter time period, the amount of motion between the images 204 and 210 is less compared to the amount of motion between the images 202 and 212, and these images 204 and 210 will have a better signal-to-noise ratio. The ambient image 206 and the flash image 208 in the third image pair are separated in time by a third time period 226, which represents the shortest period of time between images in any of the pairs. Because the images 206 and 208 are separated by the shortest time period, the minimum amount of motion between the images in any of the pairs occurs in these images 206 and 208, and these images 206 and 208 will have the best signal-to-noise ratio of the pairs.

Because the time periods 222, 224, and 226 overlap, the motion in the pair of images 206 and 208 is also captured in the other two pairs of images, and the motion in the pair of images 204 and 210 is also captured in the pair of images 202 and 212. Because the image pairs can have overlapping and yet different amounts of motion and at least one of the image pairs (the images 206 and 208) should have only a small amount or no motion, the images can be effectively processed in later operations to remove motion artifacts from the final image of the scene being produced. Also, because the ambient images 202, 204, and 206 can be captured rapidly (such as in a burst mode) and the flash images 208, 210, and 212 can be captured rapidly (such as in another burst mode), all of the images can be captured quickly in order to reduce or minimize the motion between the images. This approach may be faster than capturing the ambient and flash images in an interleaved manner (one ambient image, one flash image, another ambient image, another flash image, and so on).

In this example, a small plateau 228 is present between the ramps 218 and 220 in the chart in FIG. 2. The plateau 228 indicates that a short time period may exist between the capture of the ambient images 202, 204, and 206 and the capture of the flash images 208, 210, and 212. This plateau 228 may be present in order to allow an adequate time for the electronic device 101 to reconfigure itself between non-flash operation and flash operation. This plateau 228 may also help to ensure that the capture of the last ambient image 206 is completed before the flash 190 is fired to capture the flash images 208, 210, and 212. Note, however, that the plateau 228 can be longer, shorter, or even omitted depending on the circumstances.

The use of multiple image pairs (each having at least one ambient image and at least one flash image) captured using different exposure times to estimate the depth map allows for more accurate or robust image rendering to produce bokeh in images of a scene. Among other reasons, this is because a single ambient/flash image pair may suffer from under-exposure or over-exposure in one or more regions of one or more images in the pair, and the use of multiple image pairs captured using different exposure times can help to avoid this problem. Moreover, this approach can be computationally less complex compared to other techniques, such as disparity-based processing that requires the use of multiple cameras to generate a depth map.

Although FIG. 2 illustrates one example of a process 200 for capturing images in a mobile electronic device, various changes may be made to FIG. 2. For example, any number of ambient and flash images could be captured here. Also, it may be possible (depending on the electronic device 101) to capture multiple ambient or flash images simultaneously or in an overlapping manner. In general, the ambient and flash images can be captured in any suitable manner that allows multiple image pairs (each with at least one ambient image and at least one flash image having a common exposure time) to be captured for further processing.

Figure 3:
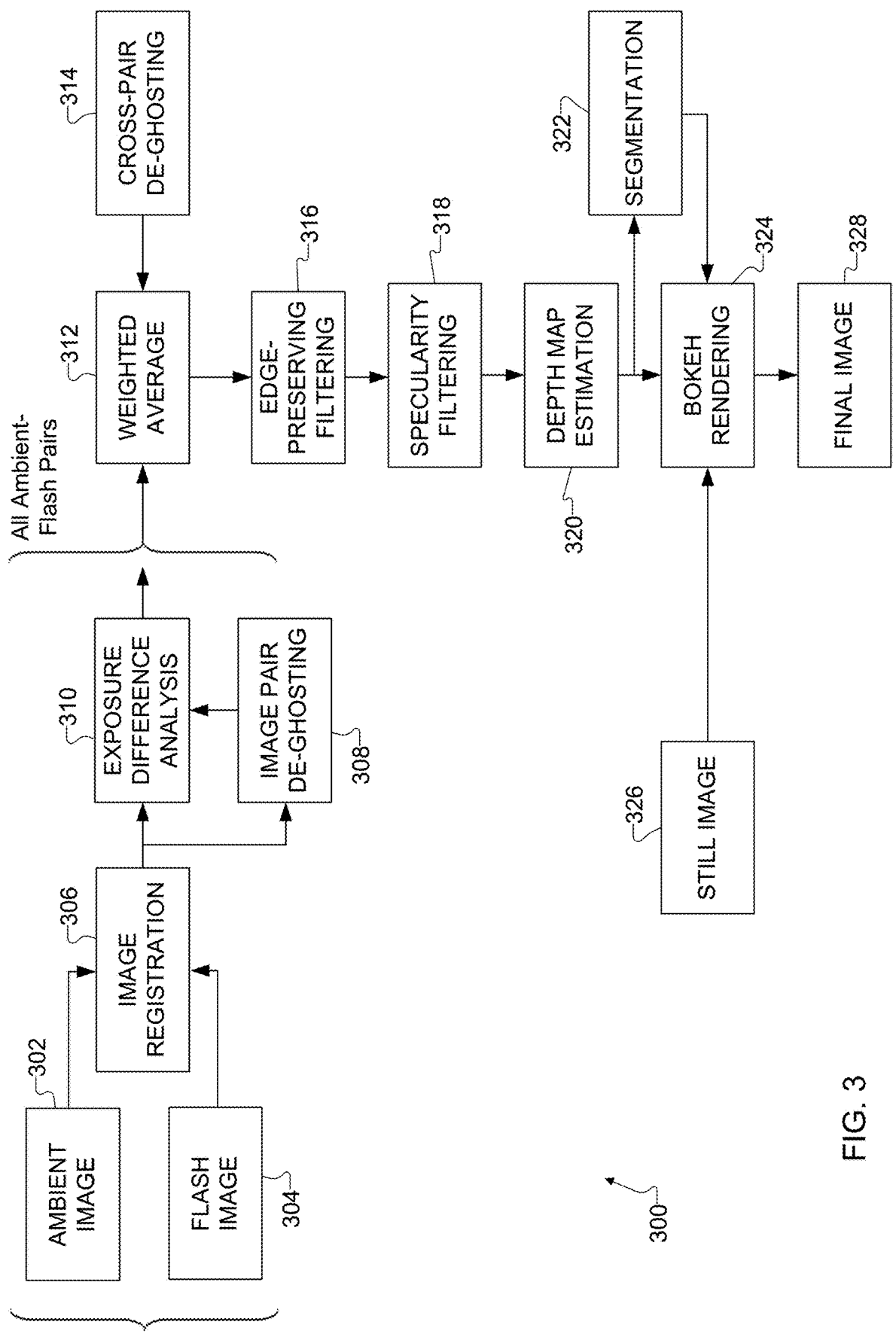
FIG. 3 illustrates an example process for multi-pair image analysis and image rendering in a mobile electronic device in accordance with this disclosure.

FIG. 3 illustrates an example process 300 for multi-pair image analysis and image rendering in a mobile electronic device in accordance with this disclosure. For ease of explanation, the process 300 shown in FIG. 3 is described as being performed using the electronic device 101 of FIG. 1. However, the process 300 shown in FIG. 3 could be used with any other suitable electronic device and in any suitable system. Also, for ease of explanation, the process 300 shown in FIG. 3 is described as operating using the ambient images 202, 204, and 206 and the flash images 208, 210, and 212 captured as shown in FIG. 2. However, the process 300 shown in FIG. 3 could be used with any other suitable ambient and flash images.

The process 300 is generally used to estimate a depth map for a scene captured in the ambient and flash images. The estimated depth map can then be used to render a final image of the scene with an appropriate bokeh. Because the depth map identifies absolute or relative depths of different portions of images of the scene, the depth map can be used to identify which portion or portions of the final image should remain in focus and which portion or portions of the image should be blurred.

As shown in FIG. 3, two images 302 and 304 in an image pair are being analyzed. The images here include one ambient image 302 (such as one of the images 202, 204, and 206) and one flash image 304 (such as one of the images 208, 210, and 212). The images 302 and 304 are provided to an image registration operation 306, which generally operates to align the images 302 and 304. Alignment may be needed if the electronic device 101 moves or rotates in between image captures and causes objects in the images to move or rotate slightly, which is common with handheld devices. The images 302 and 304 here can be aligned both geometrically and photometrically. In some embodiments, the image registration operation 306 can use global Oriented FAST and Rotated BRIEF (ORB) features and local features from a block search to align the images. One example implementation of the image registration operation 306 is described below, although other implementations of the image registration operation 306 could also be used.

The aligned images are output and processed using an image pair de-ghosting operation 308 and an exposure difference analysis operation 310. The image pair de-ghosting operation 308 processes the aligned images to identify motion occurring in the images, such as people or objects moving within the images. In some embodiments, the de-ghosting operation 308 divides each of the aligned images into tiles, such as sixteen tiles arranged in a four-by-four grid. The de-ghosting operation 308 then processes the tiles to identify motion, where the motion is identified as differences between the tiles. In this way, the de-ghosting operation 308 generates a motion map to identify areas in the images 302 and 304 where motion is occurring. For instance, each motion map could include black pixels indicating where no motion is detected and white pixels indicating where motion is detected. One example implementation of the de-ghosting operation 308 is described below, although other implementations of the de-ghosting operation 308 could also be used.

The exposure difference analysis operation 310 analyzes the aligned images to identify exposure differences that are obtained using the flash 190 of the electronic device 101. The exposure differences generally identify areas where the exposure in the flash images 208, 210, and 212 improved compared to the ambient images 202, 204, and 206. The exposure differences could be expressed in any suitable manner. In some embodiments, for example, the exposure differences can be expressed as a grayscale image referred to as an exposure difference map, where darker pixels in the grayscale image identify areas where the exposure differences were smaller and brighter pixels in the grayscale image identify areas where the exposure differences were larger. For instance, if the original ambient and flash images 302 and 304 included a person in the foreground and a dark background, the grayscale image would likely include many white pixels in the area of the images where the person was located, since the illumination from the flash 190 would greatly improve the brightness of the person in the flash images. In contrast, the grayscale image would likely include many dark pixels in the area of the images where the background was located, since the illumination from the flash 190 may not improve (or would only slightly improve) the brightness of the background in the flash images.

Note that the operations 306, 308, and 310 here can be performed for each pair of ambient/flash images captured by the electronic device 101. As noted above, the images 302 and 304 in a pair being processed using the operations 306, 308, and 310 can generally be captured at the same exposure time, and different image pairs can be captured using different exposure times. Moreover, the images can be captured in the symmetrical manner as shown in FIG. 2.

Because the ambient/flash images can be captured by the electronic device 101 using different exposure times, different images may often have resulting data that is reliable in some areas and not reliable in other areas. The exposure differences resulting from the operations 306, 308, and 310 for the different pairs of ambient/flash images can therefore be averaged in a weighted averaging operation 312, which averages the exposure differences obtained for the different exposure times. The weighting of the averaging operation 312 allows the averaging operation 312 to essentially weight portions of the exposure differences differently based on whether those exposure differences are more or less likely to be important in the generation of a depth map.

In this example, the weights used by the averaging operation 312 are provided by a cross-pair de-ghosting operation 314. The cross-pair de-ghosting operation 314 processes the aligned flash images 208, 210, and 212 captured at the different exposure times to identify motion occurring in those images. In some embodiments, the de-ghosting operation 314 divides each of the aligned flash images 208, 210, and 212 into tiles, such as sixteen tiles arranged in a four-by-four grid. The de-ghosting operation 314 then processes the tiles to identify motion, where the motion is identified as differences between the tiles. In this way, the de-ghosting operation 314 generates motion maps to identify areas in the aligned flash images 208, 210, and 212 where motion is occurring. For instance, each motion map could include black pixels indicating where no motion is detected and white pixels indicating where motion is detected. One example implementation of the de-ghosting operation 314 is described below, although other implementations of the de-ghosting operation 314 could also be used. By identifying where motion is occurring in the flash images 208, 210, and 212, the averaging operation 312 can weight areas where motion is not occurring higher and weight areas where motion is occurring lower. This helps to reduce or remove motion from the averaged exposure differences generated by the averaging operation 312.

The averaged exposure differences are passed through an edge-preserving filtering operation 316, which analyzes the averaged data and filters the data to help preserve edges within the averaged data. The edges could denote the edges of one or more people or objects in the foreground of the images or in the background of the images. Various types of edge-preserving filters are known in the art. In some embodiments, the edge-preserving filtering operation 316 could represent a bilateral filter, which operates to replace the intensity of each average pixel with a weighted average of intensity values from nearby average pixels. Note, however, that other implementations of the edge-preserving filtering operation 316 could be used.

The filtered averaged exposure differences from the edge-preserving filtering operation 316 are passed through a specularity filtering operation 318, which analyzes the data and filters or removes blobs or other objects in the exposure differences. For example, one or more objects in the background of a scene could be specular or reflective, and those objects can reflect light from the flash 190 and produce a large exposure difference even though they are in the background of the scene. Examples of such objects can include windows, mirrors, license plates, eyeglasses, or other specular or reflective surfaces. The specularity filtering operation 318 can perform blob detection or other types of detection in order to identify likely areas in the averaged exposure differences that are the result of specular surfaces and should be removed. One example implementation of the specularity filtering operation 318 is described below, although other implementations of the specularity filtering operation 318 could also be used.

The output of the specularity filtering operation 318 is ideally a final averaged and processed exposure difference map (such as a grayscale image) that identifies which portions of the ambient and flash images 202-212 experience the greatest exposure differences when the flash 190 is used. This final exposure difference map is then processed in a depth map estimation operation 320, which generally operates to convert the final exposure difference map into an estimated depth map for the scene. For example, the depth map estimation operation 320 can use the final exposure difference map to identify the likely areas of the scene that should remain in focus when rendering a final image of the scene. The depth map estimation operation 320 can also use the final exposure difference map to identify the likely areas of the scene that should be blurred when rendering the final image of the scene in order to provide suitable bokeh in the final image. One example implementation of the depth map estimation operation 320 is described below, although other implementations of the depth map estimation operation 320 could also be used.

The estimated depth map is provided to a segmentation function 322 and a bokeh rendering function 324. The segmentation function 322 generally operates to divide the scene being imaged into areas to remain in focus and areas to be blurred based on the depth map. The output of the segmentation function 322 can represent a binary mask, where white pixels identify the areas of the scene to be kept in focus and black pixels identify the areas of the scene to be blurred. The bokeh rendering function 324 generally operates to receive a still image 326 of the scene and blur portions of the still image 326 in accordance with the binary mask and the depth map to generate a final image 328 having a suitable bokeh. For example, the bokeh rendering function 324 could keep the areas of the image 326 identified by the white pixels in the binary mask in focus. For areas identified by the black pixels in the binary mask, the bokeh rendering function 324 could blur those areas, such as by an amount that is dependent on the associated pixels in the depth map. Various types of segmentation functions and bokeh rendering functions are known in the art.

The still image 326 here could represent one of the original images (such as one of the ambient images 202, 204, and 206 or one of the flash images 208, 210, and 212) captured earlier. The still image 326 could also represent a new image of the scene, such as an image captured before the first ambient image 202 was captured or after the last flash image 212 was captured. The still image 326 could represent any suitable image to under rendering to produce bokeh, such as a non-flash image, a flash image, or an image generated using standard high dynamic range (HDR) image processing. The still image 326 could also represent an image generated in accordance with the techniques disclosed in U.S. patent application Ser. No. 16/278,543, entitled "APPARATUS AND METHOD FOR CAPTURING AND BLENDING MULTIPLE IMAGES FOR HIGH-QUALITY FLASH PHOTOGRAPHY USING MOBILE ELECTRONIC DEVICE" being filed concurrently herewith (which is hereby incorporated by reference in its entirety).

The output of the process 300 is at least one final image 328 of the scene, where a foreground or one or more subjects (such as one or more people or objects) in the scene are in focus and a background or remainder of the scene is blurred. For example, the final image 328 may include one or more people or one or more objects in a foreground of the scene in focus, while background objects or other background contents in the scene are blurred. Ideally, the blurred portions of the final image 328 help to focus attention on the one or more people or objects in the foreground, thereby providing a more visually-appealing image.

Figure 4:
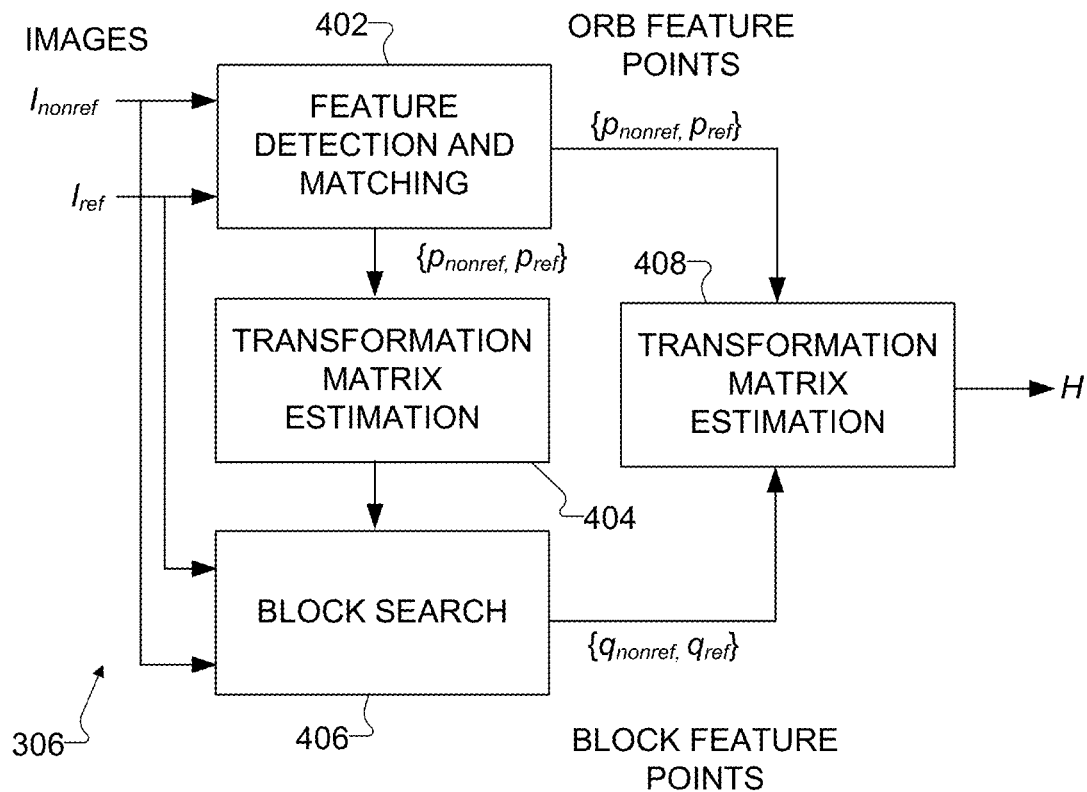
FIG. 4 illustrates an example process for an image registration operation in the process of FIG. 3 in accordance with this disclosure.

FIG. 4 illustrates an example process for an image registration operation 306 in the process 300 of FIG. 3 in accordance with this disclosure. As described above, the image registration operation 306 is used to align multiple images (such as the images 302 and 304) captured by the electronic device 101. In FIG. 4, two images, namely a reference image (one of the images 302 and 304) and a non-reference image (the other of the images 302 and 304), are aligned by fitting a transformation matrix H to matched feature points. A pair of matched feature points represents a feature point in one image that is matched to a corresponding feature in the other image. Overall, this helps to compensate for movement of the camera/electronic device 101 or movement of a subject or object in the images being captured.

As shown in FIG. 4, a reference image $I_{ref}$ and a non-reference image $I_{nonref}$ are provided to a feature detection and matching function 402, which generally operates to identify the feature points in each image and match the feature points common to both images. In this example, the matched feature points are expressed as $\{p_{nonref}, p_{ref}\}$ values. The feature detection and matching function 402 can use any suitable technique for identifying and matching feature points, such as ORB feature detection and matching. Various types of feature point detection and matching are known in the art. A first transformation matrix estimation function 404 receives the matched feature points $\{p_{nonref}, p_{ref}\}$ and generates an initial estimate of the transformation matrix. The initial estimate represents an initial guess of the transformation matrix that could be used to transform the features points of the non-reference image to match the features points of the reference image. Various types of transformation matrix estimation techniques are known in the art, such as linear estimation.

The reference and non-reference images and the initial estimate of the transformation matrix are provided to a block search function 406. Unlike the feature detection and matching (which matches feature points), the block search function 406 attempts to match blocks in the reference and non-reference images after at least one of the images has been transformed using the initial estimate of the transformation matrix. This allows the block search to be guided by the identified feature points. In this example, the matched blocks are expressed as $\{q_{nonref}, q_{ref}\}$ values. The block search function 406 can use any suitable technique for identifying and matching blocks.

A second transformation matrix estimation function 408 receives the matched feature points $\{p_{nonref}, p_{ref}\}$ and the matched blocks $\{q_{nonref}, q_{ref}\}$ and generates a final estimate of the transformation matrix H. The final estimate ideally represents the best estimate of the transformation matrix to be used to transform the features points and blocks of the non-reference image to match the features points and blocks of the reference image. Once the non-reference image is transformed using the transformation matrix H, the non-reference image is generally aligned with the reference image. Again, various types of transformation matrix estimation techniques are known in the art, such as linear estimation.

The results from performance of the process in FIG. 4 are ideally a pair of images that are generally aligned with one another. Note that the process shown in FIG. 4 can be repeated for each pair of images 302 and 304 captured by the electronic device 101 as described above. Thus, for example, the process shown in FIG. 4 can be performed for the pair of images 202 and 212, the pair of images 204 and 210, and the pair of images 206 and 208.

Figure 5:
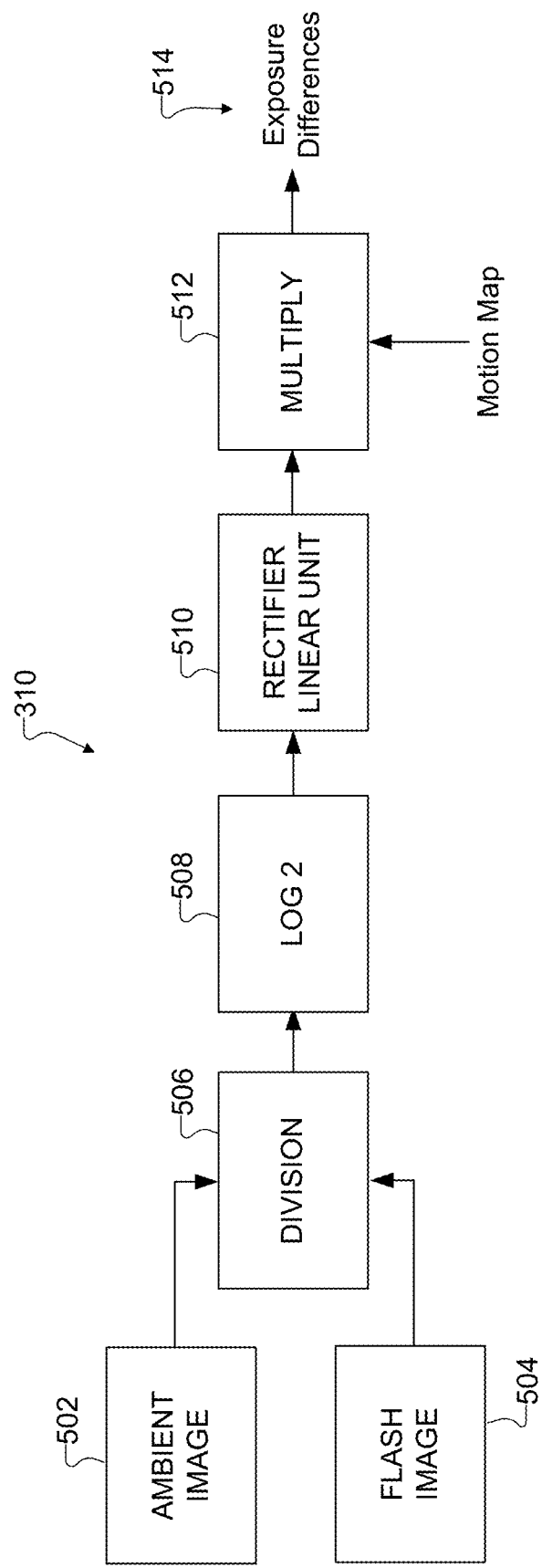
FIG. 5 illustrates an example process for an exposure analysis operation in the process of FIG. 3 in accordance with this disclosure.

FIG. 5 illustrates an example process for an exposure difference analysis operation 310 in the process 300 of FIG. 3 in accordance with this disclosure. As described above, the exposure difference analysis operation 310 is used to identify exposure differences between aligned ambient and flash images 302 and 304, thereby identifying the exposure differences that are obtained through the use of the flash 190 of the electronic device 101.

As shown in FIG. 5, two images 502 and 504 in an aligned image pair are being analyzed. The images here include one ambient image 502 (such as of the images 202, 204, and 206) and one flash image 504 (such as one of the images 208, 210, and 212) after alignment by the image registration operation 306. The images 502 and 504 are subject to a division operation 506, which divides the value of each pixel in one image 502 or 504 by the value of the corresponding pixel in the other image 504 or 502. The quotient values resulting from the division are subjected to a logarithmic operation 508 (a log 2 operation in this example) to convert the quotient values into the logarithmic domain. A rectifier linear unit 510 operates to prevent the values in the logarithmic domain from being negative, such as by selecting (for each value in the logarithmic domain) the greater of that value or zero.

The output of the rectifier linear unit 510 generally represents the exposure differences between the two images 502 and 504 converted into the logarithmic domain and processed to have a set range of values (such as greater than zero). A multiplication function 512 then multiplies this data by a motion map received from the image pair de-ghosting operation 308. As noted above, the motion map identifies areas in the images 502 and 504 where motion has been detected. The multiplication function 512 allows the exposure differences in those areas to be reduced or removed from final exposure differences 514 (which may take the form of a final exposure difference map) output from the exposure difference analysis operation 310. As noted above, the process shown in FIG. 5 can be repeated for each ambient/flash image pair in order to generate a collection of final exposure difference maps, which can then be averaged by the weighted averaging operation 312.

FIGS. 6, 7, 8, 9, and 10 illustrate an example process for a de-ghosting operation 308 or 314 in the process 300 of FIG. 3 in accordance with this disclosure. Note that the same process in these figures can be used for the image pair de-ghosting operation 308 and the cross-pair de-ghosting operation 314 with proper adjustment of tuning parameters. As described above, the de-ghosting operation 308 or 314 is used to identify motion in aligned versions of images captured by the electronic device 101.

Figure 6:
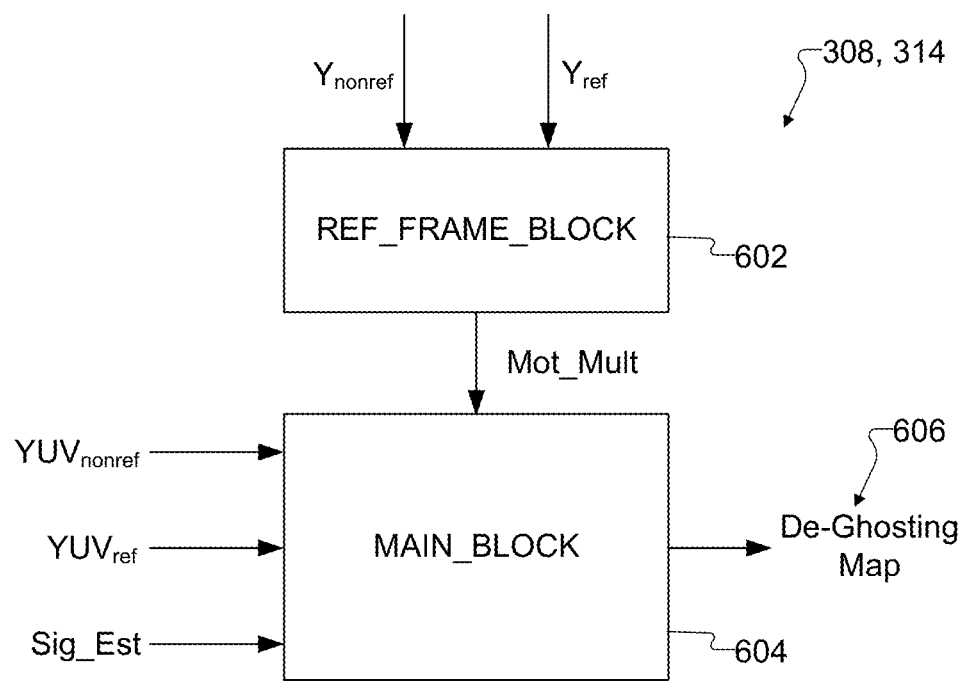

As shown in FIG. 6, the de-ghosting operation 308 or 314 generally includes operations performed by a reference frame block 602 and a main block 604. The reference frame block 602 receives luminance (Y) values of a reference image and a non-reference image and generates a motion multiplier (Mot Mutt) for the two images. The motion multiplier controls how aggressively the main block 604 in the de-ghosting operation 308 or 314 will be in terms of rejecting pixels with high difference as motion. The main block 604 receives the motion multiplier, the luminance values of the reference and non-reference images, and chrominance values (U and V) of the reference and non-reference images, along with any desired tuning parameters (such as a noise level estimate denoted Sig_Est). The noise level estimate can be based on the ISO level of the camera during the capture of the images. The main block 604 uses this information to generate a de-ghosting map 606 for the two images. The de-ghosting map 606 (also referred to as a motion map) identifies areas in the two images where motion is occurring and should be removed, thereby identifying the expected motion and noise level in the images.

In the de-ghosting operation 308, the process shown in FIG. 6 can be repeated for each of the ambient/flash image pairs. In each iteration, for example, the reference image could be one of the flash images 208, 210, and 212, and the non-reference image could be one of the ambient images 202, 204, and 206 (or vice versa). In the de-ghosting operation 314, the process shown in FIG. 6 can be repeated for different pairs of flash images 208, 210, and 212, typically using the same image from the group as the reference image.

FIG. 7 illustrates an example implementation of the reference frame block 602 in FIG. 6. As shown in FIG. 7, the reference frame block 602 includes downscaling functions 702 and 704. The downscaling function 702 receives the luminance values $Y_{ref}$ of the reference image and downscales the luminance values to produce downscaled luminance values $Y_{ref\_DS}$. Similarly, the downscaling function 704 receives the luminance values $Y_{nonref}$ of the non-reference image and downscales the luminance values to produce downscaled luminance values $Y_{nonref\_DS}$. The downscaling allows less data to be processed in subsequent operations, which can help to speed up the subsequent operations. Any suitable amount of downscaling can be used, such as by downscaling the data by a factor of four. However, downscaling is not necessarily required here.

A difference function 706 identifies the differences between the downscaled luminance values (or of the original luminance values) on a pixel-by-pixel basis. Assuming there is no movement between the two images, the difference function 706 outputs a difference map identifying only the differences between the images, which (ideally) represent motion within the images. For example, the difference map could have darker pixels indicating little difference between the image pixel values and brighter pixels indicating more differences between the image pixel values. A histogram function 708 generates a histogram based on the difference map, which quantifies motion statistics within a tile.

A threshold/transfer function 710 receives the motion statistics from the histogram function 708 and the noise level estimate Sig_Est. The threshold/transfer function 710 uses the noise level estimate to identify when differences detected in the images are actually representative of motion in the images. The output of the threshold/transfer function 710 is a motion multiplier 712.

FIG. 8 illustrates an example implementation of the main block 604 in FIG. 6. As shown in FIG. 8, the main block 604 includes an edge strength filter 802 and a main sub-block 804. The edge strength filter 802 receives the luminance values $Y_{ref}$ of the reference image, the noise level estimate Sig_Est, and the motion multiplier Mot_Mult and generates a norm map, which is used by the main sub-block 804. One example implementation of the edge strength filter 802 is described below, although other implementations of the edge strength filter 802 could also be used. The main sub-block 804 receives the luminance and chrominance values $YUV_{ref}$ and $YUV_{nonref}$ of the reference and non-reference images, along with the norm map. The main sub-block 804 uses this information to generate the de-ghosting map 606. One example implementation of the main sub-block 804 is described below, although other implementations of the main sub-block 804 could also be used.

Figure 9:
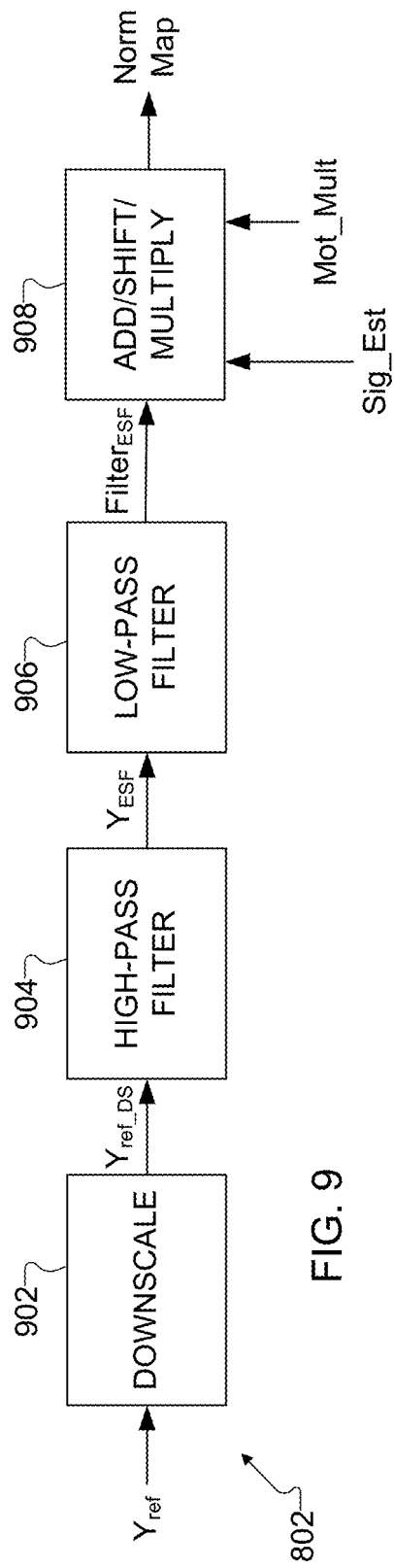

FIG. 9 illustrates an example implementation of the edge strength filter 802 of the main block 604 in FIG. 8. As shown in FIG. 9, the edge strength filter 802 includes a downscaling function 902, which receives the luminance values $Y_{ref}$ of the reference image and downscales the luminance values to produce downscaled luminance values $Y_{ref\_DS}$. Any suitable downscaling can be used here (such as downscaling by a factor of four), although no downscaling may be needed. The downscaled luminance values $Y_{ref\_DS}$ are passed through a high-pass filter 904 to produce edge values (denoted $Y_{ESF}$), which represent rough edges in the scene. The edge values are passed through a low-pass filter 906 to produce filtered edge values (denoted $Filter_{ESF}$), which represent smoothed edges in the scene. The high-pass filter 904 represents any suitable high-pass filter for filtering pixel values, such as a 3×3 high-pass filter. The low-pass filter 906 represents any suitable low-pass filter for filtering pixel values, such as a 5×5 low-pass filter.

The filtered edge values are provided to an add/shift/multiply function 908, which also receives the noise level estimate Sig_Est and the motion multiplier Mot_Mult. The add/shift/multiply function 908 operates to generate the norm map using this information, where the norm map is used to normalize the motion due to pixel differences within a tile as described below. The add/shift/multiply function 908 can use the filtered edge values $Filler_{ESF}$, noise level estimate Sig_Est, and motion multiplier Mot_Mult in any suitable manner to generate the norm map. In some embodiments, the add/shift/multiply function 908 generates the norm map by performing the following calculation, although other suitable calculations could also occur.

$$((Sig\_Est+Filter_{ESF})*Mot\_Mult/4)/16 \qquad (1)$$

Figure 10:
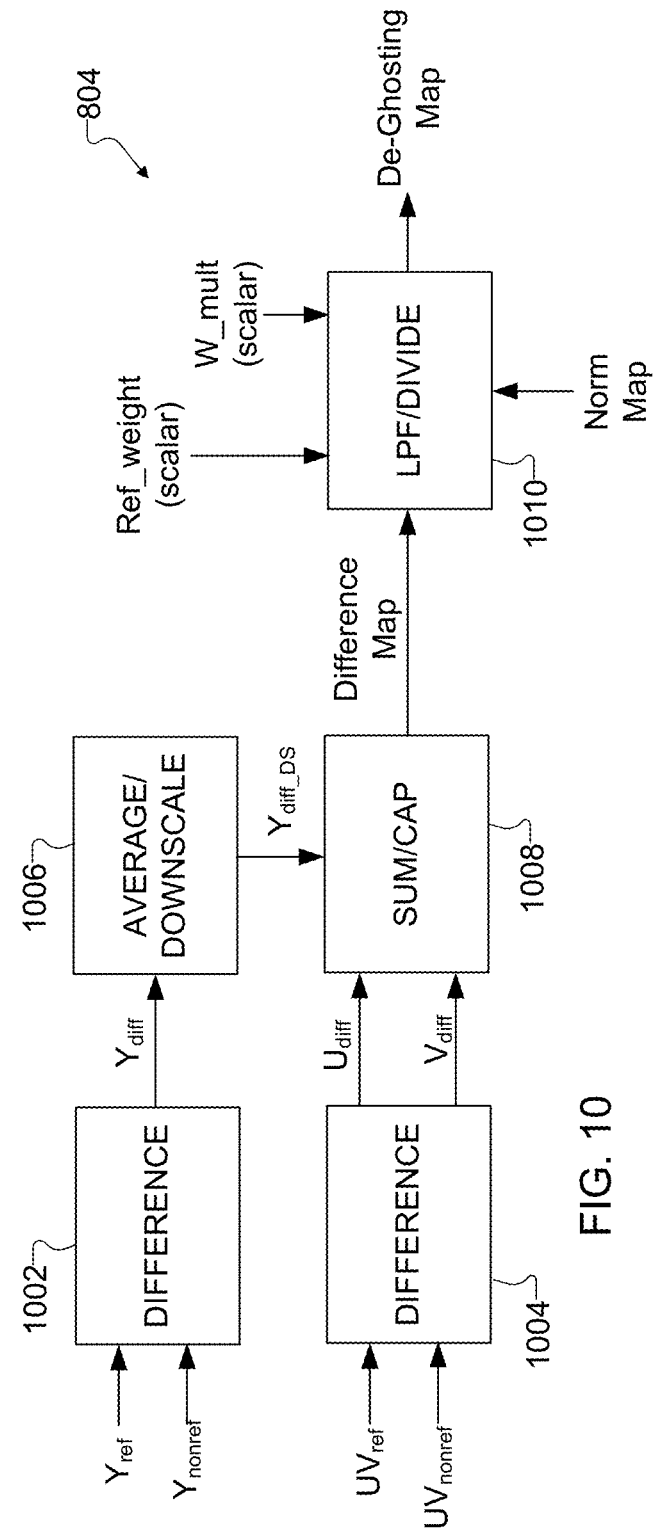

FIG. 10 illustrates an example implementation of the main sub-block 804 of the main block 604 in FIG. 8. As shown in FIG. 10, the main sub-block 804 includes difference functions 1002 and 1004. The difference function 1002 identifies the differences $Y_{diff}$ between the luminance values $Y_{ref}$ and $Y_{nonref}$ of the reference and non-reference images, and the difference function 1004 identifies the differences $U_{diff}$ and $V_{diff}$ between the chrominance values $UV_{ref}$ and $UV_{nonref}$ of the reference and non-reference images. The differences $Y_{diff}$ in the luminance values are provided to an average/downscale function 1006, which averages sets of luminance value differences to downscale the size of the luminance value differences and produce downscaled luminance value differences $Y_{diff\_DS}$. Again, any suitable downscaling can be used here (such as downscaling by a factor of four), although no downscaling may be needed.

A sum/cap function 1008 receives the downscaled luminance value differences $Y_{diff\_DS}$ and the chrominance value differences $U_{diff}$ and $V_{diff}$ and operates to generate the difference map, which identifies the differences between the images. The sum/cap function 1008 can use the downscaled luminance value differences $Y_{diff\_DS}$ and chrominance value differences $U_{diff}$ and $V_{diff}$ in any suitable manner to generate the difference map. In some embodiments, the sum/cap function 1008 generates the difference map by performing the following calculation, although other suitable calculations could also occur.

$$Diff=(Y_{diff\_DS}+(U_{diff}+V_{diff})/2)^2 \qquad (2)$$

$$Diff\_map=Diff*(Y_{ref}<Sat\_Thr) \qquad (3)$$

where Diff_map represents the difference map pixel values and Sat_Thr represents a saturation threshold.

The difference map is provided to a low-pass filter (LPF)/divide function 1010, which also receives the norm map and two scalar values. One scalar value represents a reference weight Ref_weight, and the other scalar value represents a weight multiplier W_mult. The low-pass filter/divide function 1010 uses the difference map, norm map, and scalar values to generate the de-ghosting map, which identifies areas in the images where motion is occurring. The low-pass filter/divide function 1010 can use the difference map, norm map, and scalar values in any suitable manner to generate the de-ghosting map. In some embodiments, the low-pass filter/divide function 1010 generates the de-ghosting map by calculating the following, although other suitable calculations could also occur.

$$Filt\_Mot=LPF(Diff\_map)/Norm\_map \qquad (4)$$

$$Deghost\_map=Ref\_weight-min(Ref\_weight, Filt\_Mot*W\_mult) \qquad (5)$$

where Deghost_map represents the de-ghosting map pixel values and LPF( ) represents a filtering function. The reference weight Ref_weight here defines the maximum value that the de-ghosting map pixels can obtain. The weight multiplier W_mult here defines the value that the Filt_Mot value is multiplied by in order to identify the amount to subtract from the reference weight Ref_weight when motion is present. Larger values of the weight multiplier W_mult therefore result in larger values subtracted from the reference weight Ref_weight, resulting in more motion being detected.

When used in the image pair de-ghosting operation 308, the process shown in FIGS. 6 through 10 can be repeated for each pair of images 302 and 304 being processed. When used in the cross-pair de-ghosting operation 314, the process shown in FIGS. 6 through 10 can be repeated for each non-reference image in the collection of flash images 208, 210, and 212, typically using the same image from the collection as the reference image.

Figure 11:
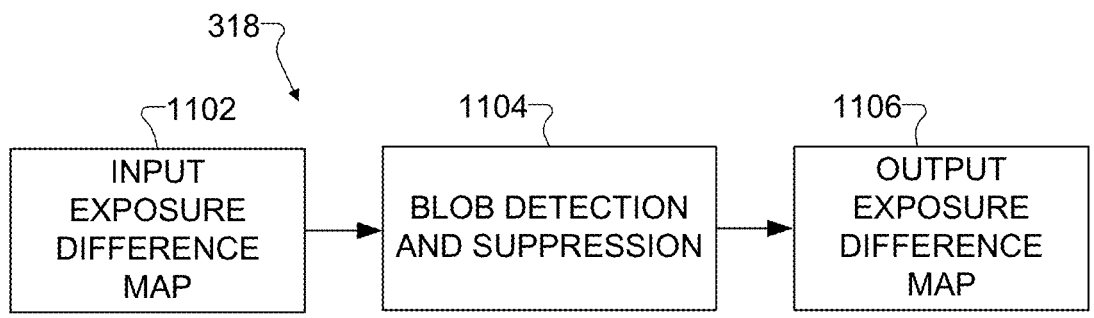
FIG. 11 illustrates an example process for a specularity filtering operation in the process of FIG. 3 in accordance with this disclosure.

FIG. 11 illustrates an example process for a specularity filtering operation 318 in the process 300 of FIG. 3 in accordance with this disclosure. As described above, the specularity filtering operation 318 is used to remove any objects in an exposure difference map generated by the weighted averaging operation 312 that are specular or reflective, resulting in a high exposure difference. Without specularity filtering, the specular or reflective objects in the background might not be blurred during the subsequent bokeh rendering function 324, even though they are in the background of a scene and should be blurred.

As shown in FIG. 11, the specularity filtering operation 318 receives an input exposure difference map 1102, such as a grayscale image that identifies areas of a scene that can be effectively exposed using the flash 190. The input exposure difference map 1102 is subjected to a blob detection and suppression operation 1104, which generally operates to identify "blobs" in the input exposure difference map 1102. Each blob can generally represent a small area of the exposure difference map 1102, typically with a random shape, that is dissimilar to its surroundings. For example, the blob detection and suppression operation 1104 could detect that a small random area having a high exposure difference is located within an otherwise low exposure difference area of the exposure difference map 1102. The blob detection and suppression operation 1104 can detect any blobs and remove them from the input exposure difference map 1102, thereby generating an output exposure difference map 1106. For instance, the blob detection and suppression operation 1104 can replace white pixels in the input exposure difference map 1102 forming blobs with black pixels in the output exposure difference map 1106. This helps to prevent those areas of the output exposure difference map 1106 from remaining in focus during the subsequent bokeh rendering function 324. Various types of blob detection and suppression are known in the art.

Figure 12:
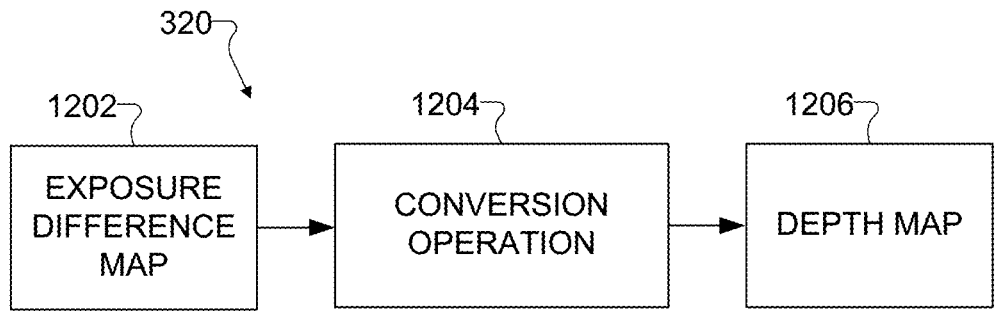
FIGS. 12 and 13 illustrate an example process for a depth map estimation operation in the process of FIG. 3 in accordance with this disclosure.
Figure 13:
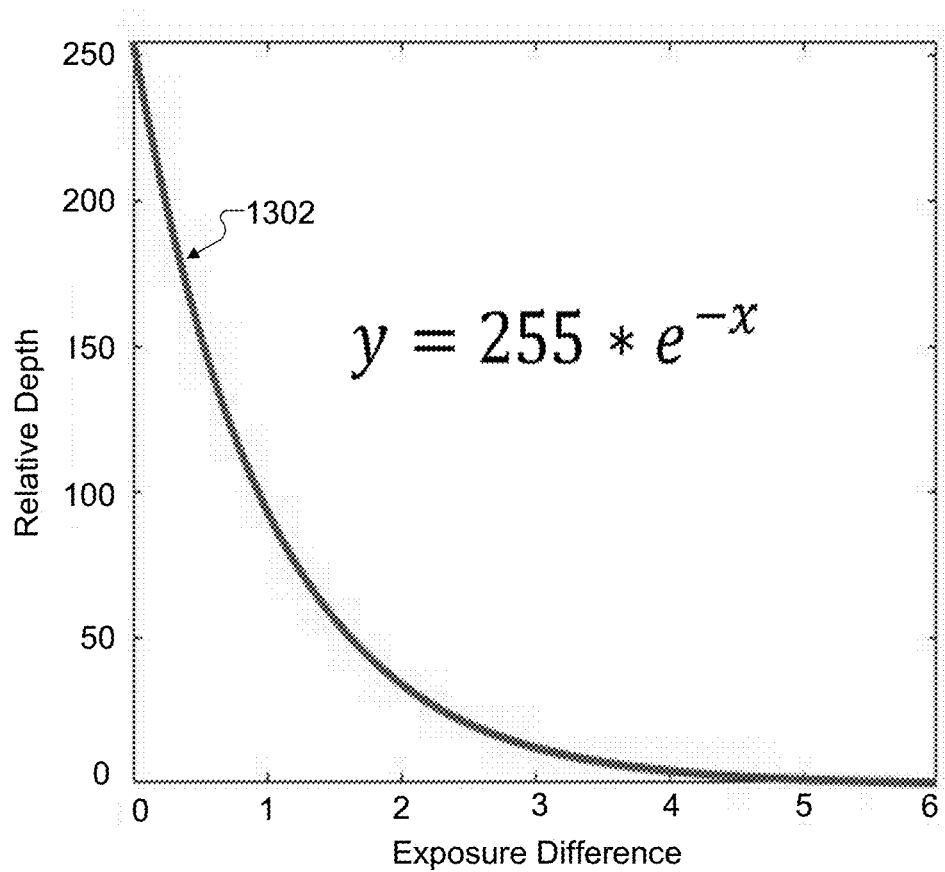

FIGS. 12 and 13 illustrate an example process for a depth map estimation operation 320 in the process 300 of FIG. 3 in accordance with this disclosure. As described above, the depth map estimation operation 320 generally operates to convert exposure differences associated with images of a scene into absolute or relative depths within a depth map associated with the scene. The depth map can then be used in the bokeh rendering function 324 to blur certain areas but not other areas in an image of the scene.

As shown in FIG. 12, the depth map estimation operation 320 receives an input exposure difference map 1202. The exposure difference map 1202 could, for example, represent the output exposure difference map 1106 generated by the specularity filtering operation 318 in FIG. 11. The depth map estimation operation 320 then performs a conversion operation 1204 to convert the exposure differences contained in the exposure difference map 1202 into depths contained in an output depth map 1206. For example, the conversion operation 1204 can apply the same function to each pixel value of the exposure difference map 1202 in order to generate a corresponding pixel value in the output depth map 1206. In some embodiments, the output depth map 1206 can include a range of pixel values (such as between zero and 255, inclusive), where darker pixels represent smaller depths and brighter pixels represent larger depths.

FIG. 13 illustrates one example of the function performed by the conversion operation 1204. As shown in FIG. 13, a line 1302 defines a function curve of $y=255\times e^{-x}$, where x represents a pixel value from the exposure difference map 1202 and y represents the corresponding pixel value in the depth map 1206. This particular function curve shown in FIG. 13 essentially helps to convert pixels that experience larger exposure differences due to the use of the flash 190 into smaller relative depths in the depth map 1206. In other words, this means that one or more subjects or objects closer to the electronic device 101 will be illuminated more when the flash 190 is fired and create larger exposure differences (compared with non-use of the flash 190), so the larger exposure differences can be converted into smaller depths from the electronic device 101. The depth map 1206 can then be output for use by the bokeh rendering function 324. It should be noted, however, that functions other than the one shown in FIG. 13 could be used by the conversion operation 1204. For instance, the actual function used with an electronic device 101 could vary based on the design or operation of the electronic device 101 or its camera(s).

Although FIG. 3 illustrates one example of a process 300 for multi-pair image analysis and image rendering in a mobile electronic device and FIGS. 4 through 13 illustrate examples of operations in the process 300 of FIG. 3, various changes may be made to FIGS. 3 through 13. For example, while shown as sequences of steps, various operations shown in FIGS. 3 through 13 could overlap, occur in parallel, occur in a different order, or occur any number of times. Also, the specific operations shown in FIGS. 4 through 13 are examples only, and other techniques could be used to perform each of the operations shown in FIGS. 4 through 13.

It should be noted that the operations shown in FIGS. 2 through 13 can be implemented in an electronic device 101 in any suitable manner. For example, in some embodiments, the operations shown in FIGS. 2 through 13 can be implemented or supported using one or more software applications or other software instructions that are executed by the processor 120 of the electronic device 101. In other embodiments, at least some of the operations shown in FIGS. 2 through 13 can be implemented or supported using dedicated hardware components. In general, the operations shown in FIGS. 2 through 13 can be performed using any suitable hardware or any suitable combination of hardware and software/firmware instructions.

It should also be noted that the operations shown in FIGS. 2 through 13 are described above as being performed using a specific implementation of the electronic device 101, but a number of modifications can be made based on the actual electronic device 101 being used. For example, the electronic device 101 could include or use a single camera or multiple cameras. If a single camera is used, multiple images of a scene could be captured sequentially, such as in one or more fast bursts. If multiple cameras are used, it may be possible to capture multiple images concurrently or in an overlapping manner, such as by capturing multiple images of a scene at the same time but with different exposure times using different cameras. If needed, multiple images of the scene could still be captured sequentially using at least one of the multiple cameras. Assuming the geometry of the multiple cameras is known ahead of time, this geometry can be used to help align the images captured by the cameras or perform other functions. Also, if multiple cameras are available, the techniques described above could be combined with other techniques for estimating depth (such as disparity-based imaging) to improve the results of the other techniques. For instance, the results obtained using the depth map as described above and disparity-based imaging could be averaged or otherwise combined to produce a final image of a scene. In addition, if multiple cameras are available, one of the cameras may be operated in a telephoto or wide-angle mode (if available) to help obtain information enabling easier or more effective feature detection/matching. As another example, the electronic device 101 is described above as performing various operations using YUV image data. However, data in other domains (such as RGB data) could also be used or processed. As a third example, the techniques described in this patent document could be combined with conventional HDR image processing algorithms or temporal noise filtering algorithms (which use multiple images captured at the same exposure), such as in a software library used by the electronic device 101. This may allow a user of the electronic device 101 to select between different image processing algorithms or other algorithms, such as based on the specific situation or based on user preference.

Figure 14:
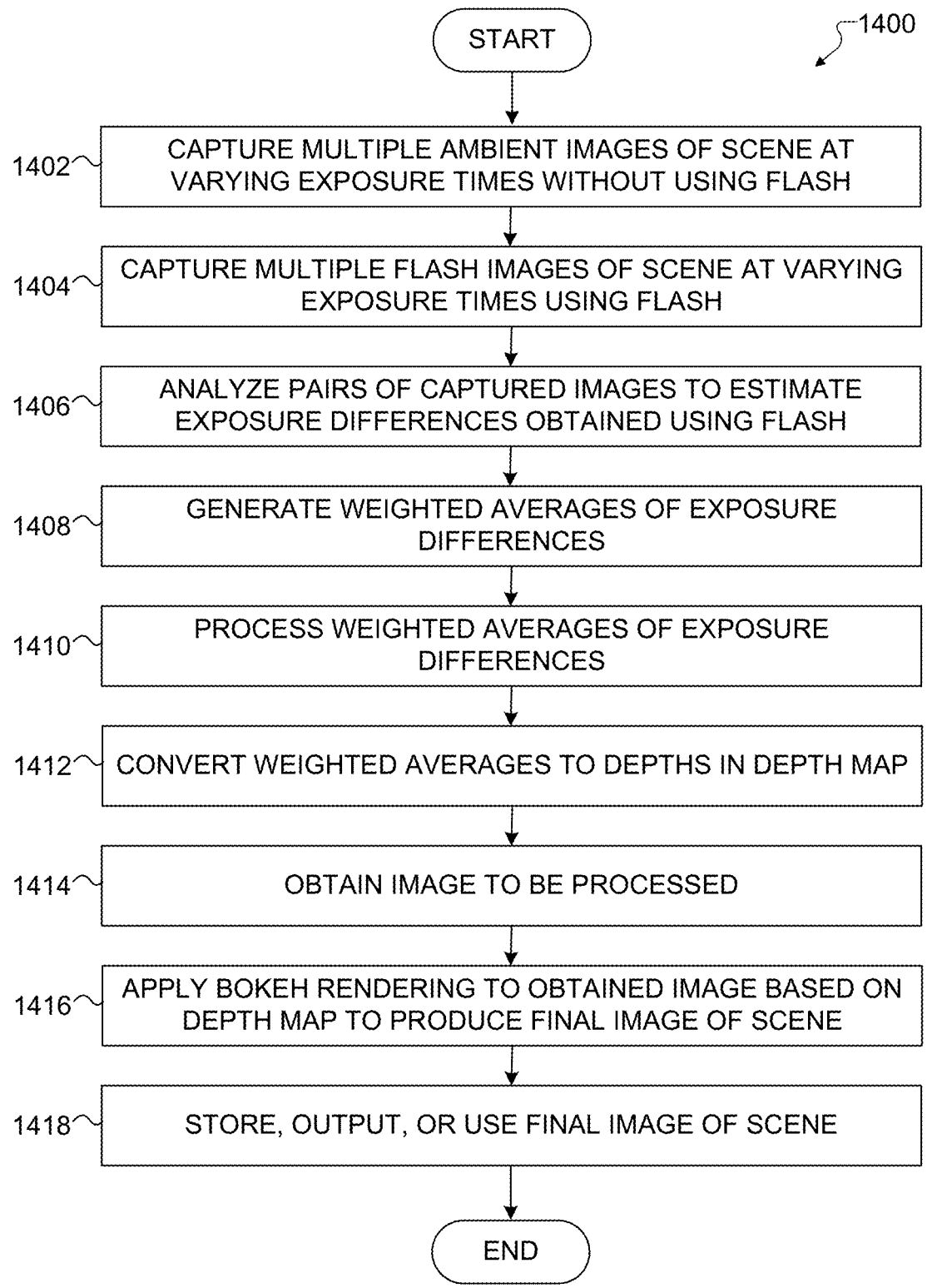
FIG. 14 illustrates an example method for multi-pair image analysis and image rendering in accordance with this disclosure.

FIG. 14 illustrates an example method 1400 for multi-pair image analysis and image rendering in accordance with this disclosure. For ease of explanation, the method 1400 shown in FIG. 14 is described as being performed using the electronic device 101 of FIG. 1 and the techniques shown in FIGS. 2 through 13. However, the method 1400 shown in FIG. 14 could be used with any other suitable electronic device and in any suitable system, and various steps in the method 1400 may or may not occur using the operations and functions shown in FIGS. 2 through 13.

As shown in FIG. 14, multiple ambient images of a scene are captured using an electronic device and without using a flash at step 1402. This could include, for example, the processor 120 of the electronic device 101 causing at least one camera of the electronic device 101 to capture the ambient images 202, 204, and 206 of the scene. This could also include the processor 120 of the electronic device 101 controlling the camera(s) to use an increasing exposure time when capturing the ambient images 202, 204, and 206. Multiple flash images of the scene are captured using the electronic device and while using the flash at step 1404. This could include, for example, the processor 120 of the electronic device 101 causing the at least one camera of the electronic device 101 to capture the flash images 208, 210, and 212 of the scene. This could also include the processor 120 of the electronic device 101 controlling the camera(s) to use a decreasing exposure time when capturing the flash images 208, 210, and 212. The increasing and decreasing exposure times can be symmetrical as described above.

Multiple pairs of the captured images are analyzed to estimate exposure differences obtained using the flash at step 1406. This could include, for example, the processor 120 of the electronic device 101 processing multiple pairs of images (each pair including one of the ambient images 202, 204, and 206 and one of the flashing images 208, 210, and 212 having a common exposure time) to identify the exposure differences between each pair of images. As a specific example, each pair of images could be processed by dividing the pixel values in the images, converting the quotients into a logarithmic domain, applying a rectifier linear unit operation, and multiplying the resulting values by a motion map generated based on the pair of images. The exposure differences for the multiple image pairs are used to generate a weighted average of the exposure differences at step 1408. This could include, for example, the processor 120 of the electronic device 101 averaging the exposure differences obtained for all pairs of ambient and flash images. This could also include the processor 120 of the electronic device 101 using motion maps associated with different pairs of flash images to weight the exposure differences for the pairs of flash images.

The weighted averages of the exposure differences are processed at step 1410. This could include, for example, the processor 120 of the electronic device 101 performing an edge-preserving filtering of the weighted averaged values. This could also include the processor 120 of the electronic device 101 performing specularity filtering of the weighted averaged values. The processed weighted averaged values of the exposure differences are converted to corresponding depths in a depth map at step 1412. This could include, for example, the processor 120 of the electronic device 101 applying the conversion operation 1204 to an exposure difference map to convert the exposure differences into corresponding relative depths in the depth map.

An image to be processed to include bokeh is obtained at step 1414. This could include, for example, the processor 120 of the electronic device 101 selecting one of the images captured previously or causing the at least one camera of the electronic device 101 to capture an additional image of the scene. As noted above, the image 326 to be processed can represent a non-flash image, a flash image, an image generated using standard HDR image processing, an image generated in accordance with the techniques disclosed in U.S. patent application Ser. No. 16/278,543, or any other suitable image. Bokeh rendering is applied to the image based on the estimated depth map to produce a final image of the scene at step 1416. This could include, for example, the processor 120 of the electronic device 101 applying the segmentation function 322 to generate a binary mask based on the estimated depth map. This could also include the processor 120 of the electronic device 101 applying the bokeh rendering function 324 to blur the image 326 in accordance with the estimated depth map and the binary mask.

The final image of the scene can be stored, output, or used in some manner at step 1418. This could include, for example, the processor 120 of the electronic device 101 displaying the final image 328 of the scene on the display 160 of the electronic device 101. This could also include the processor 120 of the electronic device 101 saving the final image 328 of the scene to a camera roll stored in a memory 130 of the electronic device 101. This could further include the processor 120 of the electronic device 101 attaching the final image 328 of the scene to a text message, email, or other communication to be transmitted from the electronic device 101. Of course, the final image 328 of the scene could be used in any other or additional manner.

Although FIG. 14 illustrates one example of a method 1400 for multi-pair image analysis and image rendering, various changes may be made to FIG. 14. For example, while shown as a series of steps, various steps in FIG. 14 could overlap, occur in parallel, occur in a different order, or occur any number of times. As a particular example, the ambient and flash images can be captured in any suitable manner.

Figure 15:
FIGS. 15 and 16 illustrate example results that can be obtained using multi-pair image analysis and image rendering in accordance with this disclosure.
Figure 16:

FIGS. 15 and 16 illustrate example results that can be obtained using multi-pair image analysis and image rendering in accordance with this disclosure. In FIG. 15, an image 1500 of a scene that includes a darker foreground with an object (a teddy bear resting on a table) and a brighter background is captured, where a flash is used to illuminate the foreground. As can be seen here, both the foreground and the background of the image 1500 are in focus, meaning little if any bokeh has been created during the generation of the image 1500.

In FIG. 16, an image 1600 of the same scene is captured using the approaches described above for multi-pair image analysis and image rendering. As can be seen here, the foreground of the scene includes the object that is in-focus. Farther objects in the foreground may be blurred slightly, and the background has been blurred more. From this example, it can be seen that bokeh has been created in the image 1600 compared to the image 1500 using the multi-pair image analysis and image rendering techniques described above.

Although FIGS. 15 and 16 illustrate examples of results that can be obtained using multi-pair image analysis and image rendering, various changes may be made to FIGS. 15 and 16. For example, FIGS. 15 and 16 are merely meant to illustrate one example of the type of results that could be obtained using the approaches described in this disclosure. Obviously, images of scenes can vary widely, and the results obtained using the approaches described in this patent document can also vary widely depending on the circumstances.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    capturing multiple pairs of images of a scene at different exposures using at least one camera of an electronic device, each pair of images comprising (i) an ambient image of the scene captured without using a flash of the electronic device and (ii) a flash image of the scene captured using the flash of the electronic device; and
    rendering a final image of the scene with a bokeh that is determined using the multiple pairs of images;
    wherein one of the ambient images or the flash images are captured in order of increasing exposure time and the other of the ambient images or the flash images are captured in order of decreasing exposure time.

2. The method of claim 1, further comprising:
    estimating a depth map associated with the scene using the pairs of images;
    wherein the bokeh is based on the depth map.

3. The method of claim 2, wherein estimating the depth map comprises:
    aligning the images;
    identifying exposure differences obtained using the flash based on different pairs of the aligned images; and
    generating weighted averages of the exposure differences.

4. The method of claim 3, wherein estimating the depth map further comprises:
    performing a first de-ghosting process to generate first motion maps for the pairs of aligned images, wherein the exposure differences are based on the first motion maps; and
    performing a second de-ghosting process to generate second motion maps for the flash images, wherein the weighted averages are based on the second motion maps.

5. The method of claim 3, wherein estimating the depth map further comprises:
    performing specularity filtering to remove one or more background objects having a strong response to the flash from the weighted averages of the exposure differences.

6. The method of claim 3, wherein estimating the depth map further comprises:
    applying a function to convert filtered weighted averages of the exposure differences to relative depths in the depth map.

7. The method of claim 1, wherein:
    the ambient images of the scene are captured with a linearly-increasing exposure time;
    the flash images of the scene are captured with a linearly-decreasing exposure time;
    a first of the ambient images and a third of the flash images both have a first exposure time and collectively capture a first amount of motion in the scene;
    a second of the ambient images and a second of the flash images both have a second exposure time that is shorter than the first exposure time; and
    a third of the ambient images and a first of the flash images both have a third exposure time that is shorter than the second exposure time and collectively capture a second amount of motion in the scene that is smaller than the first amount of motion in the scene.

8. An electronic device comprising:
    at least one camera;
    a flash; and
    at least one processing device configured to:
        capture multiple pairs of images of a scene at different exposures using the at least one camera, each pair of images comprising (i) an ambient image of the scene captured without using the flash and (ii) a flash image of the scene captured using the flash; and
        render a final image of the scene with a bokeh that is determined using the multiple pairs of images;
    wherein the at least one processing device is configured to capture one of the ambient images or the flash images in order of increasing exposure time and the other of the ambient images or the flash images in order of decreasing exposure time.

9. The electronic device of claim 8, wherein:
    the at least one processing device is further configured to estimate a depth map associated with the scene using the pairs of images; and
    the bokeh is based on the depth map.

10. The electronic device of claim 9, wherein, to estimate the depth map, the at least one processing device is configured to:
    align the images;
    identify exposure differences obtained using the flash based on different pairs of the aligned images; and
    generate weighted averages of the exposure differences.

11. The electronic device of claim 10, wherein, to estimate the depth map, the at least one processing device is further configured to:
    perform a first de-ghosting process to generate first motion maps for the pairs of aligned images, wherein the exposure differences are based on the first motion maps; and
    perform a second de-ghosting process to generate second motion maps for the flash images, wherein the weighted averages are based on the second motion maps.

12. The electronic device of claim 10, wherein, to estimate the depth map, the at least one processing device is further configured to perform specularity filtering to remove one or more background objects having a strong response to the flash from the weighted averages of the exposure differences.

13. The electronic device of claim 10, wherein, to estimate the depth map, the at least one processing device is further configured to apply a function to convert filtered weighted averages of the exposure differences to relative depths in the depth map.

14. The electronic device of claim 8, wherein:
    the at least one processing device is configured to capture the ambient images of the scene with a linearly-increasing exposure time and to capture the flash images of the scene with a linearly-decreasing exposure time;
    a first of the ambient images and a third of the flash images both have a first exposure time and collectively capture a first amount of motion in the scene;
    a second of the ambient images and a second of the flash images both have a second exposure time that is shorter than the first exposure time; and
    a third of the ambient images and a first of the flash images both have a third exposure time that is shorter than the second exposure time and collectively capture a second amount of motion in the scene that is smaller than the first amount of motion in the scene.

15. A non-transitory machine-readable medium containing instructions that when executed cause at least one processor of an electronic device to:
    capture multiple pairs of images of a scene at different exposures using at least one camera of the electronic device, each pair of images comprising (i) an ambient image of the scene captured without using a flash of the electronic device and (ii) a flash image of the scene captured using the flash of the electronic device; and
    render a final image of the scene with a bokeh that is determined using the multiple pairs of images;
    wherein the instructions that when executed cause the at least one processor to capture the multiple pairs of images comprise:
        instructions that when executed cause the at least one processor to capture one of the ambient images or the flash images in order of increasing exposure time and the other of the ambient images or the flash images in order of decreasing exposure time.

16. The non-transitory machine-readable medium of claim 15, further containing instructions that when executed cause the at least one processor to estimate a depth map associated with the scene using the pairs of images;
    wherein the bokeh is based on the depth map.

17. The non-transitory machine-readable medium of claim 16, wherein the instructions that when executed cause the at least one processor to estimate the depth map comprise:
    instructions that when executed cause the at least one processor to:
        align the images;
        identify exposure differences obtained using the flash based on different pairs of the aligned images; and
        generate weighted averages of the exposure differences.

18. The non-transitory machine-readable medium of claim 17, wherein the instructions that when executed cause the at least one processor to estimate the depth map further comprise:
    instructions that when executed cause the at least one processor to:
        perform a first de-ghosting process to generate first motion maps for the pairs of aligned images, wherein the exposure differences are based on the first motion maps; and
        perform a second de-ghosting process to generate second motion maps for the flash images, wherein the weighted averages are based on the second motion maps.

19. The non-transitory machine-readable medium of claim 17, wherein the instructions that when executed cause the at least one processor to estimate the depth map further comprise:
    instructions that when executed cause the at least one processor to apply a function to convert filtered weighted averages of the exposure differences to relative depths in the depth map.

20. The non-transitory machine-readable medium of claim 15, wherein:
    the instructions that when executed cause the at least one processor to capture the multiple pairs of images comprise:
        instructions that when executed cause the at least one processor to capture the ambient images of the scene with a linearly-increasing exposure time and to capture the flash images of the scene with a linearly-decreasing exposure time;
    a first of the ambient images and a third of the flash images both have a first exposure time and collectively capture a first amount of motion in the scene;
    a second of the ambient images and a second of the flash images both have a second exposure time that is shorter than the first exposure time; and
    a third of the ambient images and a first of the flash images both have a third exposure time that is shorter than the second exposure time and collectively capture a second amount of motion in the scene that is smaller than the first amount of motion in the scene.

* * * * *